UNITED STATES PATENT OFFICE.

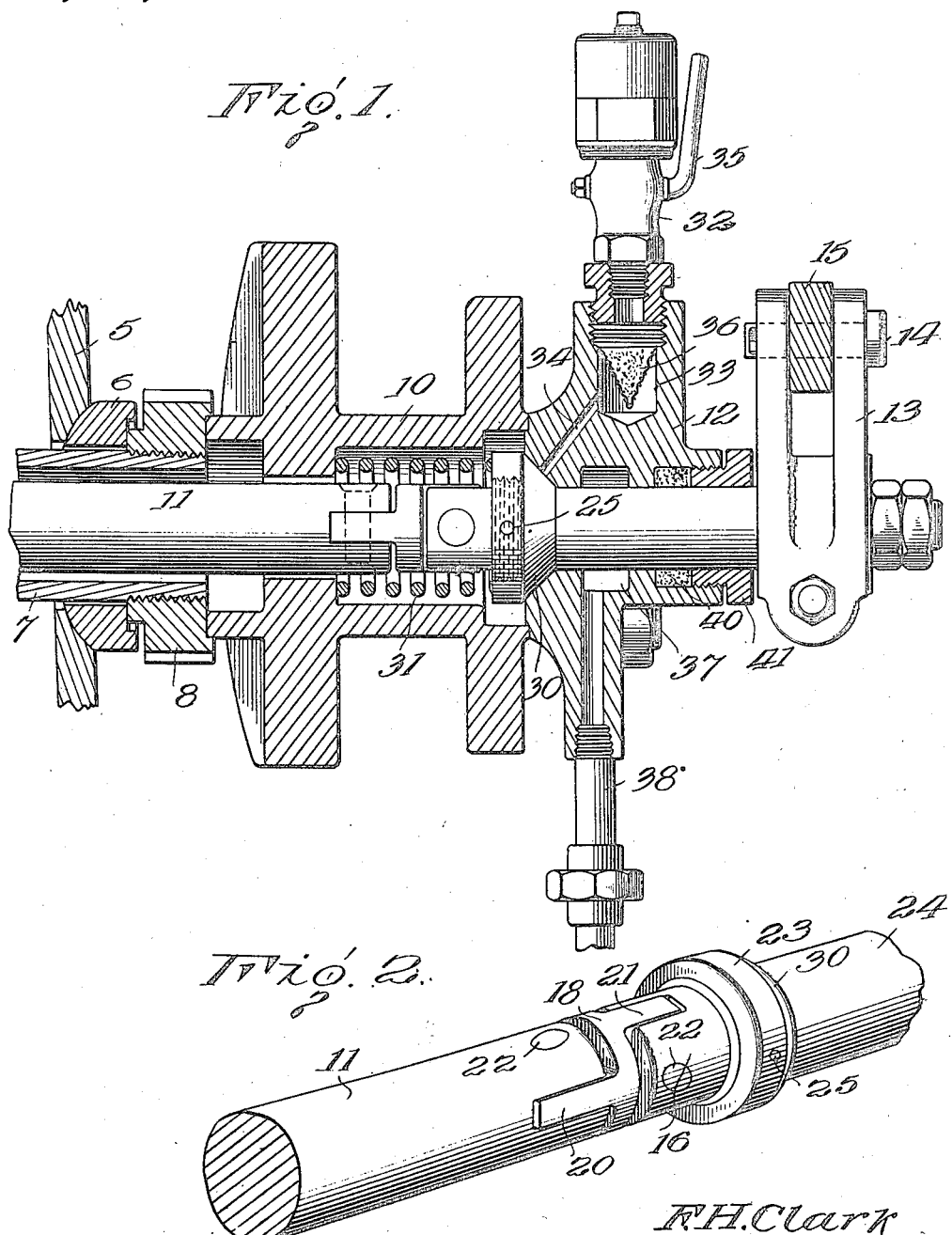

FRANK H. CLARK AND JOSEPH M. COFFEY, OF NEW YORK, N. Y., ASSIGNORS TO CHAMBERS VALVE COMPANY, OF NEW YORK, N. Y.

STUFFING-BOX.

1,247,642.  Specification of Letters Patent.  Patented Nov. 27, 1917.

Application filed May 23, 1917. Serial No. 170,518.

*To all whom it may concern:*

Be it known that we, FRANK H. CLARK and JOSEPH M. COFFEY, citizens of the United States, residing at New York, in the county of New York and State of New York, have invented certain new and useful Improvements in Stuffing-Boxes, of which the following is a specification.

This invention relates to stuffing boxes and more particularly to stuffing boxes adapted for use in connection with the actuating mechanism for the throttle valves of steam boilers, preferably of the locomotive type, although with slight modification, it is susceptible to other uses as will appear obvious from the following disclosure. The present invention is directed largely to certain improvements over the structure illustrated and described in our co-pending application filed May 19, 1916, Serial Number 98,651.

One of the objects of the present invention is to provide a simple and practical stuffing box adapted for boilers or the like which will be reliable and efficient in use and operation. A further object is to provide a stuffing box of the above character having relatively few parts which will be inexpensive to manufacture and install and permit ready inspection, repacking, etc. A further object is to provide a stuffing box together with the associated actuating shaft that will be free from binding of parts during operation, and which will also permit the stuffing box to remain steam-tight even when the inner end of the shaft is out of line. A further object is to provide a stuffing box in which the parts are compactly arranged adjacent the steam dome or boiler and thereby avoid obstructing the view of the track. A further object is to provide an improved dust-proof stuffing box which may be conveniently and easily lubricated and drained. Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof, all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Figure 1 is a longitudinal sectional elevation of the stuffing box and associated parts; and Fig. 2 is a perspective view of the actuating shaft passing through the stuffing box.

Referring now to the drawings in detail, 5 denotes the side wall of the steam dome of a boiler of the locomotive type. This wall is provided with an opening having a concave spherical periphery adapted to be engaged by a convex spherical adjustable member 6 mounted upon a sleeve 7 extending through to the throttle box (not shown) and held in adjusted position by a nut 8 in the manner described in our co-pending application. Adjacent the nut 8 is a body member 10 secured to the steam dome and having a central longitudinal opening through which an actuating shaft 11 passes. The body member is provided with an end flange or cover member 12 also having a longitudinal opening through which the shaft 11 passes as shown clearly in Fig. 1. The end of the shaft 11 is preferably square and has attached thereto a bifurcated crank arm 13 provided with a pivot 14 passing through the end of an actuating pull rod 15 which extends rearwardly to the cab. These parts, broadly speaking, are very similar in position and arrangement to that shown in our prior application.

It will be noted that the actuating shaft 11 as shown more clearly in Fig. 2, is composed of a plurality of parts, one part denoted broadly by the numeral 11 extends from the stuffing box through the sleeve 7 to the throttle box casing (not shown) within the steam dome. This construction permits the shaft 11 to be removed with the stuffing box when the throttle is closed. Another part 16 is flexibly or universally connected with the part 11 by means of a member 18 which is preferably in the form of a disk having oppositely extending lips 20 and 21 at right angles to each other and engaging the bifurcated adjacent ends of the members 11 and 16. These lips are held in place by means of riveted over pivot pins 22, as shown, thus permitting the shaft as a whole to bend in any direction, and prevent any binding should the throttle valve fail to be in proper alinement. It will also insure a complete closing of the throttle valve under all conditions and positions thereof. The member 16 is provided with a threaded end engaging a tapped out recess in an enlarged flanged end 23 of shaft member 24, the latter extending through cover member 12 to a point outside where it is engaged by the crank arm as above explained. A key pin or set screw 25 passes through the flange 23 to prevent loosening of this threaded connection. It is thus seen that the actuating shaft 11 is made up of a plurality of parts and includes a universal joint which is intended to take care of all irregularities in alining the valve with respect to the throttle box whereby a binding of parts during the rotative operation thereof will be positively prevented should the connections in the valve become distorted in any way.

The flange 23 is provided with a bevel bearing surface 30 adapted to engage directly with a corresponding surface on the cover member 12. This member 12 is preferably made of cast iron and the parts are ground to fit accurately, the flange 23 being held closely adjacent thereto by means of a coiled spring 31 around the shaft 11 and within the chambered body member 10. When the throttle valve is open the steam will hold parts together, and the spring is only necessary when no steam pressure acts on the rear of the flange 23.

To provide suitable lubrication for these adjacent surfaces, an oil cup 32 is screwed into a lubricating chamber 33 in the upper part of the cover member 12. A duct 34 leads directly to the ground bearing surface 30. A valve 35 controls the flow of oil and suitable straining means 36, such as a cone of hair or the like, is mounted at the lower end of the lubricant cup 32 and prevents dirt and cinders from entering the bearing.

Within the cover member 12 there is provided a drip chamber 37 having a duct and pipe connection 38 at its lower end for conveying the liquid, such as condensed steam and oil downwardly to a point below the boiler. Suitable packing means 40 is held in place by means of a nut 41 which retains these parts in a position and prevents any escapage of steam therethrough. The parts are all compactly and closely arranged adjacent the steam dome and in no way obstruct the view of the track ahead to the engineer in the cab.

It is therefore clear that the present invention provides a simple and practical stuffing box particularly adapted for use in connection with locomotives in which the parts may be easily and quickly applied, removed, or replaced. They are compactly arranged, inexpensive to manufacture, and reliable and efficient in use and operation. When the steam is off at the throttle box the stuffing box cover and shaft may be removed and inspected without danger.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

We claim:

1. In combination with a stuffing box having a chamber, an actuating shaft passing through the chamber of said stuffing box, and a universal joint in said shaft within said chamber.

2. In a stuffing box, in combination, a body member provided with an internal chamber, and an actuating shaft passing through said chamber composed of a plurality of parts having a flexible connection within said chamber.

3. In a device of the character described, in combination, a stuffing box having a chamber, end members for said box one of which is provided with a curved surface whereby it may be adjustably connected with the steam dome, a shaft passing through said dome and stuffing box and having a universal connection within the stuffing box.

4. In a device of the character described, in combination, a stuffing box body member having a chamber, end members associated therewith, one of which is provided with a curved bevel surface whereby the alinement of the stuffing box with respect to the dome may be adjusted, a shaft composed of a plurality of parts passing through said stuffing box chamber, said parts being connected within the chamber to provide a flexible joint and an end thrust bearing on said shaft co-acting with the opposite end member.

5. In combination with a stuffing box having a closed end, an actuating shaft passing therethrough comprising two parts having a universal joint connection within the box, and a third member connected with one of said parts having a bearing adapted to coact directly with the closed end.

6. In combination with a stuffing box having a closed end, an actuating shaft passing therethrough comprising two parts flexibly connected within said box, a third member to which one of said parts is rigidly connected, said third member having a bearing adapted to coact directly with the closed end, and means for lubricating said bearing.

7. In combination with a stuffing box, an end cover member therefor, an actuating shaft passing therethrough comprising a plurality of parts having a universal joint connection within said box, one of said parts having a bearing surface adapted to coact directly with the end cover member, means for lubricating said member, and means for removing any fluid that may have passed said bearing.

8. In a device of the character described, in combination, a stuffing box comprising a body member, a cover member associated therewith both being provided with registering longitudinal openings, an operating shaft passing through said openings comprising a plurality of flexibly connected parts within the box, a flange on said operating shaft having an inclined bearing surface, said cover member being made of metal and having a ground bearing surface adapted to coact with said first mentioned bearing surface, and means for urging said bearing surfaces into direct and close engagement with each other.

9. In a device of the character described, in combination, a stuffing box comprising a body member, and a cover member associated therewith both being provided with registering longitudinal openings, an operating shaft passing through said openings made of a plurality of parts having universal connections, a flange on said operating shaft having a bearing surface, said cover member having a bearing surface ground to coact with said first mentioned bearing surface, and means for urging said bearing surfaces into engagement with each other including a spring spirally wound around said universal connection of the operating shaft and mounted within the body member of said stuffing box.

10. In a device of the character described, in combination, a stuffing box comprising a body member and a cover member associated therewith both being provided with registering longitudinal openings, a flexible operating shaft passing through said openings made of a plurality of parts, a flange on one part having a bearing surface, said cover member having a ground bearing surface adapted to coact with said first mentioned bearing surface, spring means for urging said bearing surfaces into engagement with each other, means for lubricating said bearing surfaces including a duct leading to the outside of said cover member, and means for draining the fluid that may have passed said bearing surfaces.

11. In a stuffing box, in combination, a body member having a longitudinal chamber, end members associated therewith, one of which provides an adjustable connection with the steam dome while the other constitutes an outside end cover for said body member, an operating shaft passing longitudinally through said body member and end members and projecting beyond to provide a connection with the actuating pull rod leading to the cab, said operating shaft being formed of a plurality of flexibly connected parts, a bearing upon one part of said shaft adapted to coact with said cover member, said cover member having a chamber formed therein, and means for draining said chamber of any liquid or oil that may pass said bearing member.

12. In a stuffing box, in combination, a body member, a cover member, an operating shaft passing through said members, and an end thrust bearing upon said operating shaft coacting with said cover member, said cover member having a lubricating duct leading to said bearing, an oil cup on said cover member and means therein for straining the oil passing from the oil cup to said duct.

13. In a stuffing box, in combination, a body member, a cover member, an operating shaft passing through said members, and an end thrust bearing upon said operating shaft coacting with said cover member, said cover member having a lubricating duct leading to said bearing, an oil cup connected with said cover, and means for straining the oil passing from the oil cup to said duct, said cover member having a collecting chamber spaced apart from said bearing, and means for draining said chamber.

14. In a stuffing box, in combination, a body member, a cover member, an operating shaft passing through said members, and an end thrust bearing upon said operating shaft coacting with said cover member, said cover member having a lubricating duct leading to said bearing, an oil cup mounted thereon, means for straining the oil passing from the oil cup to said duct, said cover member having a chamber adapted to receive condensed steam and lubricant that may pass said bearing, and a pipe connection for conducting such liquid to a point below the boiler.

15. In a device of the character described, in combination, a stuffing box chamber having a removable end wall, a bearing surface associated with said wall, a shaft passing through said chamber having a flange coacting with said bearing surface, a universal joint in said shaft within the chamber and a spring surrounding the joint and engaging the flange to urge the flange into engagement with said bearing surface.

16. In a device of the character described, in combination, a stuffing box having a chamber, a shaft composed of a plurality of parts passing loosely through said stuffing box chamber, said parts being universally connected within the chamber and a member interposed between the stuffing box and the steam dome or the like having a curved bevel surface whereby the alinement of the stuffing box may be adjusted with respect to the opening in the steam dome or the like.

In testimony whereof we affix our signatures in presence of two witnesses.

FRANK H. CLARK.
JOSEPH M. COFFEY.

Witnesses:
A. B. FAHNESTOCK,
E. GOODMAN.